United States Patent
Chen et al.

(10) Patent No.: US 10,614,089 B2
(45) Date of Patent: Apr. 7, 2020

(54) MANAGING OPINION DATA

(71) Applicant: EMC Corporation, Hopkinton, MA (US)

(72) Inventors: Chao Chen, Shanghai (CN); Jingjing Liu, Shanghai (CN); Jiang Ma, Shanghai (CN); Laiqiang Ding, Shanghai (CN); Qiyan Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1151 days.

(21) Appl. No.: 14/572,059

(22) Filed: Dec. 16, 2014

(65) Prior Publication Data
US 2015/0178360 A1 Jun. 25, 2015

(30) Foreign Application Priority Data
Dec. 25, 2013 (CN) .......................... 2013 1 0737050

(51) Int. Cl.
*G06F 16/20* (2019.01)
*G06F 16/25* (2019.01)
(Continued)

(52) U.S. Cl.
CPC .......... *G06F 16/254* (2019.01); *G06F 16/245* (2019.01); *G06F 16/313* (2019.01);
(Continued)

(58) Field of Classification Search
CPC ......... G06F 17/30563; G06F 17/30616; G06F 17/30914; G06F 17/2785; G06F 17/30424; G06F 17/30
See application file for complete search history.

(56) References Cited

U.S. PATENT DOCUMENTS 7,013,311 B2 * 3/2006 Hui .................. G06F 17/30923
707/760
8,417,713 B1 * 4/2013 Blair-Goldensohn ......................
G06F 17/30867
705/347
(Continued)

FOREIGN PATENT DOCUMENTS

CN    101901212 A    12/2010
CN    102385579 A    3/2012
(Continued)

*Primary Examiner* — Kristopher Andersen
(74) *Attorney, Agent, or Firm* — BainwoodHuang

(57) ABSTRACT

Embodiments of the present invention provide a method and apparatus for managing opinion data. In an embodiment, there is provided a method for managing opinion data. The method comprises: acquiring an opinioned sentence from one or more text sources; extracting an opinion tuple based on the opinioned sentence, the opinion tuple at least containing an opinion word and an opinion target. The method further comprises: storing in association the opinioned sentence, opinion tuple and source information corresponding to the opinioned sentence, wherein the source information is associated with the text source from which the opinioned sentence is acquired. The opinioned sentence, the opinion tuple and the source information acquired from the text sources are stored in association by using for example an XML storage format so that the stored opinion data are associated to a certain degree, and the stored opinion data are easily extended and modified.

17 Claims, 6 Drawing Sheets

(51) Int. Cl.
  *G06F 16/245*  (2019.01)
  *G06F 17/27*   (2006.01)
  *G06F 16/84*   (2019.01)
  *G06F 16/31*   (2019.01)
  *G06F 16/30*       (2019.01)
  *G06F 16/80*       (2019.01)

(52) U.S. Cl.
  CPC .......... *G06F 16/84* (2019.01); *G06F 17/2785*
  (2013.01); *G06F 17/271* (2013.01); *G06F 17/2705* (2013.01)

(56)       References Cited

U.S. PATENT DOCUMENTS

| | | | |
|---|---|---|---|
| 9,600,566 B2* | 3/2017 | Ganti | G06F 17/2795 |
| 2011/0225115 A1 | 9/2011 | Moitra et al. | |
| 2012/0303358 A1* | 11/2012 | Ducatel | G06F 17/2211 |
| | | | 704/9 |
| 2014/0188457 A1* | 7/2014 | Fink | G06F 17/2785 |
| | | | 704/9 |

FOREIGN PATENT DOCUMENTS

| | | |
|---|---|---|
| CN | 102890702 A | 1/2013 |
| CN | 102929863 A | 2/2013 |
| CN | 103049435 A | 4/2013 |

* cited by examiner

MANAGING OPINION DATA

RELATED APPLICATION

This Application claims priority from Provisional Application Serial No. CN201310737050.3 filed on Dec. 25, 2013 entitled "METHOD AND APPARATUS FOR OPINION DATA MANAGEMENT," the content and teachings of which are hereby incorporated by reference in their entirety.

TECHNICAL FIELD

Embodiments of the present disclosure generally relate to the field of decision support and, more specifically, for managing opinion data that are conducive to decision support.

BACKGROUND

As information era progresses, people can acquire a large amount of information, wherein information containing a user's opinion, sentiment inclination and the like may be generally referred to as opinion data. Businesses and advertisers and so on may use opinion data to assist decision making, for example, a decision on production, sales or advertisement investment for certain goods may be made in accordance with a users' inclination degrees towards the goods.

There are various text sources containing opinion data, wherein text sources are data sources convertible into text, such as thesis, investigation materials, blogs, microblogs and user's comments, as well as video, audio and images that may be converted into text for reading and the like. Furthermore, these opinion data are usually unstructured data. Therefore, it is difficult to make all-round statistics of the opinion data and use them to support decision making.

SUMMARY OF THE INVENTION

Though there are several methods for managing opinion data, there is still a need to improve on known methods for processing information making them efficient and usable under different scenarios for decision support. Various embodiments of the present disclosure provide a method and apparatus for managing opinion data that are conducive to decision support.

According to a first aspect of the present disclosure, there is provided a method for managing opinion data. The method includes acquiring an opinioned sentence from one or more text sources; extracting an opinion tuple based on the opinioned sentence, the opinion tuple at least containing opinion words and an opinion target, and storing in association the opinioned sentence, opinion tuple and source information corresponding to the opinioned sentence, wherein the source information is associated with the text source from which the opinioned sentence is acquired.

According to an alternative embodiment of the present disclosure, acquiring the opinioned sentence from one or more text sources includes one or more of: acquiring the opinioned sentence associated with a pre-defined subject from one or more text sources; acquiring the opinioned sentence relating to subjective content from one or more text sources; dropping the opinioned sentence identical with previously-acquired opinioned sentences upon acquiring the opinioned sentence from one or more text sources.

According to an alternative embodiment of the present disclosure, the opinion tuple further includes an opinion holder and a sentiment value, and extracting the opinion tuple based on the opinioned sentence includes performing syntactic parsing for the opinioned sentence to obtain the opinion target, opinion holder and opinion words contained in the opinioned sentence; and determining the sentiment value based on the opinion word.

According to an alternative embodiment of the present disclosure, determining the sentiment value based on the opinion words includes determining a sentiment score and a sentiment weight corresponding to each opinion word; and calculating/computing the sentiment value according to the sentiment score and sentiment weight of each opinion word.

According to an alternative embodiment of the present disclosure, the source information includes one or more of a text source name, geographical location and time corresponding to the opinioned sentence.

According to an alternative embodiment of the present disclosure, storing in association the opinioned sentence, opinion tuple and source information corresponding to the opinioned sentence includes classifying the opinioned sentence, opinion tuple and source information according to one or more items in the source information corresponding to the opinioned sentence; and storing in association the opinioned sentence, opinion tuple and source information in each class.

According to an alternative embodiment of the present disclosure, storing in association the opinioned sentence, opinion tuple and source information corresponding to the opinioned sentence includes storing the opinioned sentence, opinion tuple and source information corresponding to the opinioned sentence in an extensible makeup language XML format.

According to an alternative embodiment of the present disclosure, storing in association the opinioned sentence, opinion tuple and source information corresponding to the opinioned sentence includes looking up an opinioned sentence including other opinion targets from the database storing opinioned sentences, opinion tuples and source information corresponding to the opinioned sentences; and adding the other opinion target in the opinion tuple corresponding to the found opinioned sentence, wherein the other opinion target is a subset of opinion target previously contained in the opinion tuple corresponding to the found opinioned sentence.

According to an alternative embodiment of the present disclosure, the method further includes acquiring an opinion target inputted by a user; looking up the opinion tuples corresponding to the acquired opinion target from the database storing opinioned sentences, opinion tuples and source information corresponding to the opinioned sentences; and displaying the found opinion tuples.

According to an alternative embodiment of the present disclosure, displaying the found opinion tuples includes making statistics of opinions words or sentiment values in the found opinion tuples; and displaying a statistics result.

According to an alternative embodiment of the present disclosure, the method further includes screening the found opinion tuples to find opinion tuples corresponding to one or more items of the source information selected by a user, wherein displaying the found opinion tuples comprises displaying the screened opinion tuples.

According to an alternative embodiment of the present disclosure, the method includes further displaying one or more items of opinioned sentences and/or source information corresponding to the found opinion tuples according to instructions received as input by a user.

According to a second aspect of the present disclosure, there is provided an apparatus for managing opinion data.

The apparatus includes a module, which further includes a first acquiring means for acquiring an opinioned sentence from one or more text sources; an extracting means for extracting an opinion tuple based on the opinioned sentence, the opinion tuple at least containing opinion words and an opinion target, and a storage means for storing in association the opinioned sentence, opinion tuple and source information corresponding to the opinioned sentence, wherein the source information is associated with the text source from which the opinioned sentence is acquired. The acquiring means, the extracting means and the storage means can be combined into the module as a single entity and the module can perform each of these tasks assigned to the separately by the acquiring means, the extracting means and the storage means. The apparatus via the module is further configured to perform each of method steps disclosed above. The module or each of the individual means may be a software component, a hardware component or a firmware component.

According to a third aspect of the present disclosure, there is provided an apparatus for managing opinion data, which includes at least one processor; and at least one memory including computer program code, and wherein the at least one memory and the computer program code are configured, with the at least on processor, to cause the apparatus to perform any of the above-mentioned methods.

According to a fourth aspect of the present disclosure, there is also provided a computer program product, which includes a computer-readable medium which carries program instructions included therein and used with a computer to cause at least one processor to perform any one of the above-mentioned methods.

Through the method, apparatus and computer program product according to several aspects and embodiments of the present disclosure, the opinioned sentence, the opinion tuple and the source information acquired from the text sources are stored in association so that the stored opinion data are associated to a certain degree, and the stored opinion data are easily extended and modified. Besides, since large opinion data capable of supporting the decision making are stored, the user can, not only acquire the opinion word or sentiment value in the opinion tuples, but also can, depending on demands, continue to drill down to get original opinioned sentences corresponding to the opinion tuples and relative source information, thereby achieving convenient and all-round opinion data provision.

It should be appreciated that flowcharts and block diagrams in the figures illustrate an apparatus, a method, as well as architecture, functions and operations executable by a computer program product according to the embodiments of the present disclosure. In this regard, each block in the flowcharts or block diagrams may represent a module, a program segment, or a part of code, which contains one or more executable instructions for performing specified logic functions. It should also be noted that, in some alternative implementations, the functions noted in the block may occur out of the order noted in the figures. For example, two blocks shown consecutively may be performed in parallel substantially or in an inverse order, depending on involved functions. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

DETAILED DESCRIPTION OF EMBODIMENTS

In the following, principles and spirit of the present disclosure will be described with reference to several exemplary embodiments as illustrated in the figures. It should be appreciated that these embodiments are describe only for those skilled in the art to better understand and thereby can implement the present disclosure, but are not intended to limit the scope of the present disclosure in any way.

Figure 1:
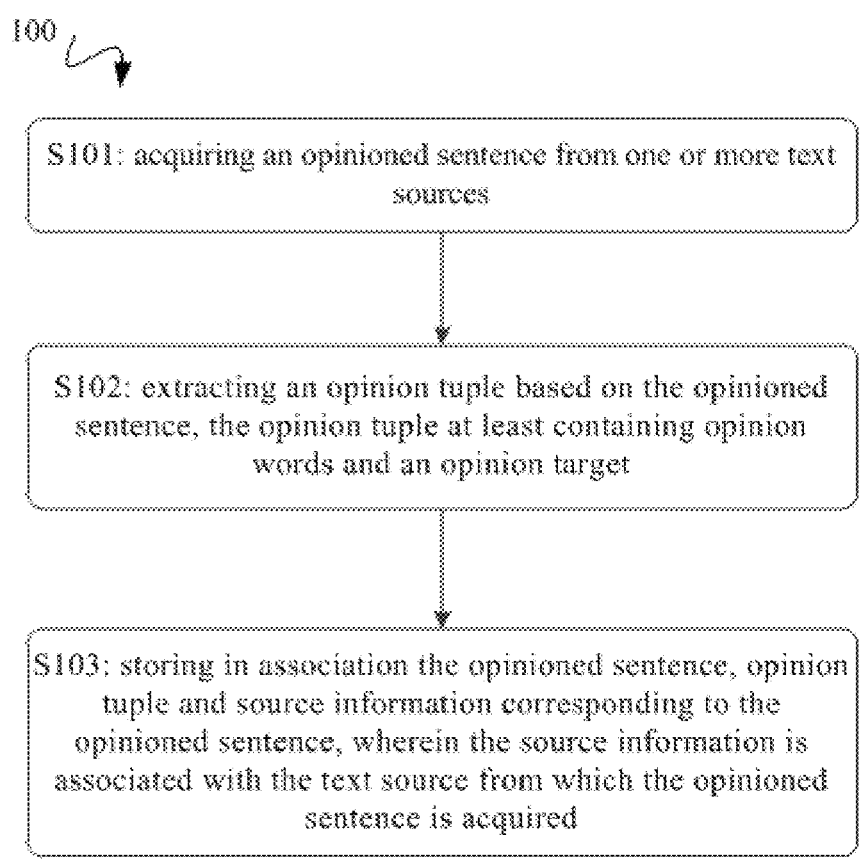
FIG. 1 illustrates an exemplary flow chart of a method for managing opinion data according to an embodiment of the present disclosure.

FIG. 1 illustrates an exemplary flow chart of a method 100 for managing opinion data according to an embodiment of the present disclosure. It should be appreciated that steps recited in the method 100 may be performed in different orders and/or in parallel. The method 100 may further comprise additional steps and/or omit execution of the illustrated steps. The scope of the present disclosure is not limited in this aspect.

In method 100, first an opinioned sentence is acquired from one or more text sources at step S101. The text sources are data sources convertible into text, which includes the following and limiting to thesis, investigation materials, blogs, microblogs, forums and user's comments, and video, audio and images that may be converted into text for reading and the like. One or more text sources from which opinioned sentences are acquired may be pre-determined according to demands, and embodiments of the present disclosure do not specifically limit the number of the text sources. In one example, a crawler may be used to crawl the opinioned sentence from different text sources. In one example, there may be one or more opinioned sentences acquired.

According to an embodiment of the present disclosure, acquiring the opinioned sentence from one or more text sources comprises one or more of the following (i) to (iii) listed below:

(i) acquiring the opinioned sentence associated with a pre-defined subject from one or more text sources. One or more subjects may be pre-defined according to demands, so as to acquiring opinioned sentences associated with the pre-defined subjects. In one example, the one or more pre-defined subjects may be submitted to a crawler so that the crawler crawls opinioned sentences associated with the pre-defined subjects. For example, a subject may be pre-defined as "vehicle", and then opinioned sentences associated with the subject "vehicle" may be acquired.

(ii) acquiring the opinioned sentence relating to subjective content from one or more text sources. Since opinioned sentences usually contain user's subjective opinion, various sentences involving subject contents may be determined from the text sources upon acquiring the opinioned sentences.

(iii) dropping the opinioned sentence identical with previously-acquired opinioned sentences upon acquiring opinioned sentence from one or more text sources. Since identical opinioned sentences may exist in different text sources or in different parts of the same text source, repetitious text contents are identified and dropped when acquiring opinioned sentences from a plurality of text sources. In one example, it may be determined whether the opinioned sentence acquired this time is identical with any previously-acquired opinioned sentences. If they are identical, the opinioned sentence acquired in the current process at the given instant of time will be dropped. It should be noted that determining whether the opinioned sentences are identical does not necessarily mean that each word and word order in the opinioned sentences are identical, but means that the semantic meaning contained in the opinioned sentences is identical according to natural language rules.

According some example embodiments of the present disclosure, acquiring the opinioned sentence from one or more text sources may include one item or a combination of more items of the above (i) to (iii). For example, it is feasible to acquire the opinioned sentence associated with a pre-defined subject and relating to subjective content from one or more text sources, and drop the opinioned sentence identical with previously-acquired opinioned sentences upon acquiring opinioned sentences.

According to other example embodiments, it is possible to set other conditions that opinioned sentences acquired from one or more text sources are needed to be met depending on the requirements. For example, in one example, an opinioned sentence that contains a certain opinion target may be acquired from one or more text sources.

Next, the method 100 proceeds to step S102 of extracting an opinion tuple based on the opinioned sentence, the opinion tuple at least containing opinion words and an opinion target, wherein the opinion words indicate a user's opinion, sentiment inclination or the like for a specific target, and the opinion target is an object to which the opinion words is directed.

According to an embodiment of the present disclosure, the opinion tuple may further include an opinion holder, wherein the opinion holder is the one who holding the opinion word. According to other embodiments of the present disclosure, the opinion tuple may also not necessarily comprise the opinion holder. Furthermore, the opinion tuple may further include a sentiment value, wherein the sentiment value can be used to represent sentiment expressed by the opinion words so that the opinion holder's sentimental intensity for the opinion target may be acquired from the sentiment value.

According to an embodiment of the present disclosure, the step of extracting the opinion tuple based on the opinioned sentence at step S102 may include performing syntactic parsing for the opinioned sentence to obtain the opinion target, opinion holder and opinion word(s) contained in the opinioned sentence; and determining the sentiment value based on the opinion words.

According to a further embodiment, each opinioned sentence in a text source may be parsed by using a nature language processing (NLP) model, to extract the opinion target, opinion holder and opinion word(s) therefrom. In one example, each opinioned sentence may be parsed more intelligently based on domain ontology.

According to a further embodiment, determining the sentiment value based on the opinion word may include determining a sentiment score and a sentiment weight corresponding to each opinion word; and calculating the sentiment value according to the sentiment score and sentiment weight of each opinion word.

Wherein, the sentiment score and sentiment weight of each opinion word may be pre-defined. In one example, the sentiment score and sentiment weight of each opinion word may be pre-defined respectively according to a field to which the opinioned sentence belongs to and the employed language. Usually, a corresponding sentiment score may be preset for an opinion word with a part of speech noun, verb or adjective. For example, the sentiment score of the opinion word "excellent" may be set as 3, and the sentiment score of the opinion word "good" may be set as 2. In one example, the sentiment score of an opinion word with negative sentiment may be set as a negative value, while the sentiment score of an opinion word with positive sentiment may be set as a positive value.

In other examples, of course, the sentiment score of an opinion word with negative sentiment may be set as a positive value, while the sentiment score of an opinion word with positive sentiment may be set as a negative value; or the sentiment score of an opinion word with negative sentiment and the sentiment score of an opinion word with positive sentiment may both be set as a negative value or a positive value, so long as the sentiment intensity of the opinion word can be distinguished from the sentiment value.

Additionally, some opinion words usually contain conjunctions or adverbs, which apply an impact on the sentiment intensity of the opinion words. Hence, a sentiment weight may be set for conjunctions, adverbs or the like which affect the sentiment intensity of the opinion words. For example, upon preceding an adjective, the adverb "very" plays a role of intensifying the adjective, and the sentiment weight 1.5 may be set for the adverb "very"; the conjunction "but" also exerts an influence on a word that follows, so the sentiment weight 1.2 may be set for the conjunction "but". Furthermore, due to formation of opinion words, one opinion word may correspond to a plurality of weights, e.g., the opinion word "but very expensive" has two weights: weight 1.2 for "but" and weight 1.5 for "very".

On the basis of the pre-defined sentiment scores and sentiment weights, the sentiment value of one opinion word may be calculated using equation (1):

$$\text{Sentiment} = \sum_{k=1}^{n} W_k \qquad \text{Equation (1)}$$

$$W_k = C \prod_{i=1}^{m} M_i$$

Where Sentiment is the sentiment value, n represents the number of opinion words in the opinioned sentence, $W_k$ represents a value of the kth opinion word in the opinioned sentence and is decided by the sentiment score and sentiment weight of the kth opinion word, C represents a sentiment value of the kth opinion word, m represents the number of weights corresponding to the kth opinion word, and $M_i$ represents the ith weight corresponding to the kth opinion word.

An opinioned sentence "Lucy says Lexus GS is nice and expensive" is acquired at step S101 by way of example. The relationship between nouns "Lucy" and "Lexus GS" and adjectives "nice and expensive" in the opinioned sentence may be determined through syntactic parsing of the opinioned sentence. Furthermore, it may be determined that the opinion target is "Lexus GS", the opinion holder is "Lucy", and opinion words are "nice" and "and expensive".

Then, the sentiment score of the opinion word "nice" is determined as 3, and the sentiment weight is 1; and the sentiment score of the adjective "expensive" in the opinion word "and expensive" is determined as −2, and the sentiment weight of the conjunction "and" is determined as 1. Hence, the sentiment value is obtained as 1 according to the sentiment score and sentiment weight of each opinion word. Hence, the resulting opinion tuple is <Lexus GS, nice and expensive, 1, Lucy>.

After extracting the opinion tuple, the method 100 proceeds to step S103 of storing in association the opinioned sentence, opinion tuple and source information corresponding to the opinioned sentence, wherein the source information is associated with the text source from which the opinioned sentence is acquired, the source information may include one or more of a text source name, geographical location and time corresponding to the opinioned sentence. The text source name comprises for example website name and periodical name. The geographic location may be a geographic region to which the acquired opinioned sentence is directed. Time may be when the opinioned sentence is published. The information all may be acquired from the text source. It should be appreciated that the above given source information is only exemplary. Alternatively or additionally, the source information may further include other information. Embodiments of the present disclosure do not specifically limit the contents included in the source information. For example, in one example, the source information may further include an author or the like. Besides, the source information is not necessarily associated with the text source from which the opinioned sentence is acquired, but can be any information that is desired to be stored.

In an embodiment of the present disclosure, not only the opinion tuple extracted in step S102 but also the opinioned sentence and the source information corresponding to the opinioned sentence are stored to facilitate subsequent further use of these opinion data.

According to an embodiment of the present disclosure, storing in association the opinioned sentence, opinion tuple and source information corresponding to the opinioned sentence includes classifying the opinioned sentence, opinion tuple and source information according to one or more items of the source information corresponding to the opinioned sentence; and storing in association the opinioned sentence, opinion tuple and source information in each class.

Since the opinioned sentence is acquired from different text sources, the classification of the acquired opinioned sentence might not be considered at step S101. To facilitate subsequent use, it is feasible to classify the opinioned sentence, and opinion tuple and source information corresponding to the opinioned sentence according to information such as the text source name, geographical location and time in the source information. For example, classification is performed according to the text source name in the source information so that the opinioned sentence, opinion tuple and source information in each class all correspond to the same text source.

According to one embodiment of the present disclosure, the storing in association the opinioned sentence, opinion tuple and source information corresponding to the opinioned sentence include storing the opinioned sentence, opinion tuple and source information corresponding to the opinioned sentence in an XML (extensible makeup language) format. XML format may create certain mutual relationships for the stored, and can store in association the opinioned sentence, opinion tuple and source information corresponding to the opinioned sentence. As compared with a structured storage manner, a database of XML format is characterized by flexible use and easy extension.

For example, the opinioned sentence, opinion tuple and source information stored in the XML format go as follows:

```
<document>
    <source>
        <website>twitter</website>
        <author>Mike</author>
        <location>Shanghai</location>
        <time>2013-09-10</time>
    </source>
    <statement>
        <target>Lexus GS</target>
        <opinion>nice and expensive</opinion>
        <holder>Lucy</holder>
        <sentiment>1</sentiment>
        <text>Lucy says Lexus GS is nice and expensive </text>
    </statement >
    <statement >
        <target>Lexus GS</target>
        <opinion>good</opinion>
        <holder>Mike</holder>
        <sentiment>2</sentiment>
        <text>Mike thinks Lexus GS is good </text>
    </statement >
    ....
</document>
```

It should be noted that the opinioned sentence, opinion tuple and source information corresponding to the opinioned sentence may be stored in other formats, which will not be limited herein by embodiments of the present disclosure. Said other formats are feasible so long as they can store in association the opinioned sentence, opinion tuple and source information corresponding to the opinioned sentence.

In some embodiments of the present disclosure, the method 100 may be executed constantly according to demands so that new opinion data are stored in the database constantly.

In a further embodiment of the present disclosure, the stored opinion data may be modified. In one example, the opinion target in the opinion tuple may be modified. If the opinion target obtained according to the syntactic parsing when the opinion tuple is previously extracted based on the opinioned sentence is a relatively generic concept, and if the opinion target in the opinion tuple needs to be subsequently classified finely, the embodiment of the present disclosure include looking up an opinioned sentence including another or any other opinion targets from the database storing opinioned sentences, opinion tuples and source information corresponding to the opinioned sentences; and adding the other opinion target in the opinion tuple corresponding to the found opinioned sentence, wherein the other opinion target is a subset of opinion target previously contained in the opinion tuple corresponding to the found opinioned sentence, namely, it is a specific concept of the previous opinion target. For example, "Lexus GS" is a specific concept of "Lexus", and "iOS" is a specific concept of "Phone".

After the another opinion target is added to the corresponding opinion tuple, the previous opinion target may be retained or deleted, which will not be specifically limited by embodiments of the present disclosure.

According to an embodiment of the present disclosure, when the opinion target is modified or an opinion target is added, if the new opinion target exists in the previously-stored opinioned sentence, opinion data (e.g., opinion tuple, opinioned sentence and source information) corresponding to the new opinion target, these need not be re-stored in the above manner, and the only modifying the previously-stored opinion data may be required.

For example, regarding the opinioned sentence "Lucy says Lexus GS is nice and expensive", if the opinion target in the opinion tuple previously extracted based on the opinioned sentence is "Lexus", to define the opinion target subsequently, an opinioned sentence including "Lexus GS" may be looked for from the database storing opinioned sentences, opinion tuples and source information corresponding to the opinioned sentences. Then, the other opinion target is added to the opinion tuple corresponding to the found opinioned sentence. In this case, if the XML format is employed for storage, <statement> previously stored in the database is as follows:

```
<statement>
    <target>Lexus </target>
    <opinion>nice and expensive</opinion>
    <holder>Lucy</holder>
    <sentiment>1</sentiment>
    <text>Lucy says Lexus GS is nice and expensive </text>
</statement >
```

If </source> stored in the database does not change after the opinion target is modified, </statement> is amended as follows:

```
<statement>
    <target>Lexus GS</target>
    <opinion>nice and expensive</opinion>
    <holder>Lucy</holder>
    <sentiment>1</sentiment>
    <text>Lucy says Lexus GS is nice and expensive </text>
</statement >
```

Therefore, to modify the stored opinion data and avoid repetition of the stored opinion data is further convenient since the XML format is employed to store opinion data such as opinion tuple, opinioned sentence and source information.

In one example, if the above opinion data employs the XML format upon storage, a query method XQuery corresponding to the XML format storage manner may be employed upon lookup. In other examples, other query methods may be employed so long as they can perform lookup from the stored opinion data.

Figure 2:
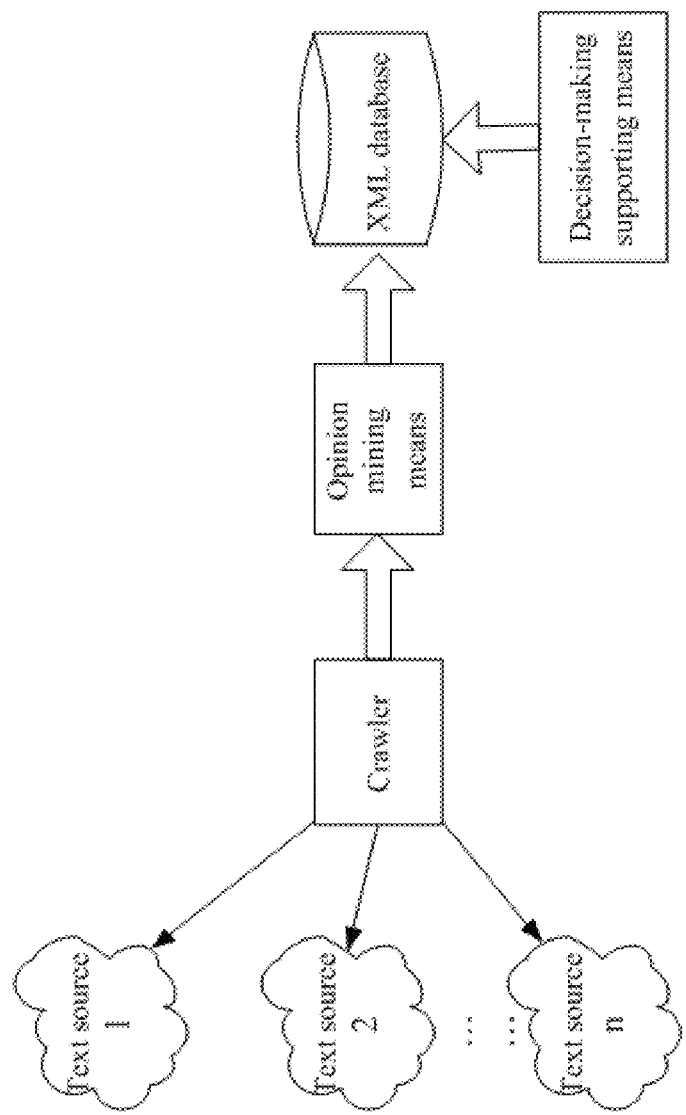
FIG. 2 illustrates an exemplary system architecture diagram of an embodiment for implementing the present disclosure.

In the above a method of storing opinion data such as opinion tuple, opinioned sentence and source information is described. Referring to FIG. 2, it illustrates an exemplary system architecture diagram according to an embodiment of the present disclosure, wherein a crawler is configured to crawl contents from text source 1 to text source n, an opinion mining means/module is configured to perform data mining for the contents crawled by the crawler to obtain an opinioned sentence and extract an opinion tuple from the opinioned sentence. The XML database is used to store the opinioned sentences, opinion tuples, source information and the like in the XML format. The opinion mining means/module may be a software component or a hardware component or a firmware component or a combination thereof.

Figure 3:
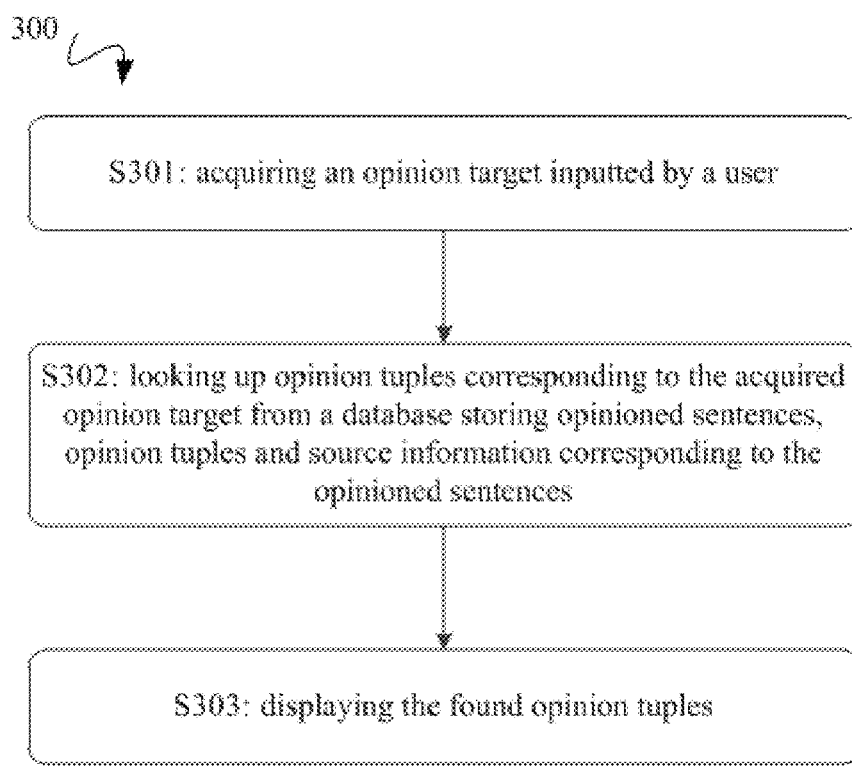
FIG. 3 illustrates an exemplary flow chart of a method for managing opinion data according to an embodiment of the present disclosure.

Then, query may be performed for the stored opinion data such as opinion tuples, opinioned sentences and source information to support the user's decision making by using the query result. FIG. 3 illustrates an exemplary flow chart of a method 300 for managing opinion data according to an embodiment of the present disclosure. It should be appreciated that steps of the method 300 may be performed in different orders and/or in parallel. The method 300 may further include a number of additional steps and/or omit execution of the illustrated steps. The scope of the present disclosure should be not limiting in this aspect.

After the method 300 starts, an opinion target inputted by a user is acquired at step S301. Usually, if the user needs to perform the decision making for a certain opinion target and needs to use the corresponding opinion data to support the decision making, a desired opinion target may be provided.

Then, the method 300 proceeds to step S301. At step S302, the opinion tuples corresponding to the acquired opinion target is looked up from the database storing opinioned sentences, opinion tuples and source information corresponding to the opinioned sentences.

As mentioned above, a suitable lookup method may be employed based on the storage format of these opinion data. In one example, if the above opinion data employs XML format upon storage, a query method XQuery corresponding to the XML format storage manner may be employed upon lookup.

Next, the method 300 proceeds to step S303 in which the found opinion tuples are displayed. According to an embodiment of the present disclosure, displaying the found opinion tuples includes making statistics of opinions words or sentiment values in the found opinion tuples; and displaying a statistics result. In one example, the display of the found opinion tuples may also be achieved by XQuery language.

For example, the following XQuery template may be employed to look up the opinion tuples corresponding to the opinion target "Lexus GS", make statistics of opinion words in the opinion tuples and display the statistics result:

```
let$opinions:=distinct-values(collection('/data')//statement[target=
'Lexus GS']/opinion)
return
<report>
    <header>
        <column type="text">Opinion</column>
        <columntype="integer"drillDownQuery="for ....">Count</column>
    </header>
    <rowset>
    {(
        for $opinion in $opinions
            let $count := count(collection('/data')//statement
[target='Lexus GS' and opinion=$opinion])
            return
                <row>
                    <cell>{ $opinion }</cell>
                    <cell>{ $count }</cell>
                </row>
    )}
    </rowset>
</report>
```

The statistical result may be displayed in many forms such as a table or a graph. In one example, a general XSLT (Extensible Stylesheet Language Transformation) may be employed to display the statistical result in the form of a HTML (HyperText Markup Language) table or a SVG (Scalable Vector Graphics) graph. The user may acquire the opinion data from the display of the statistical result of the opinion tuple.

Figure 4:
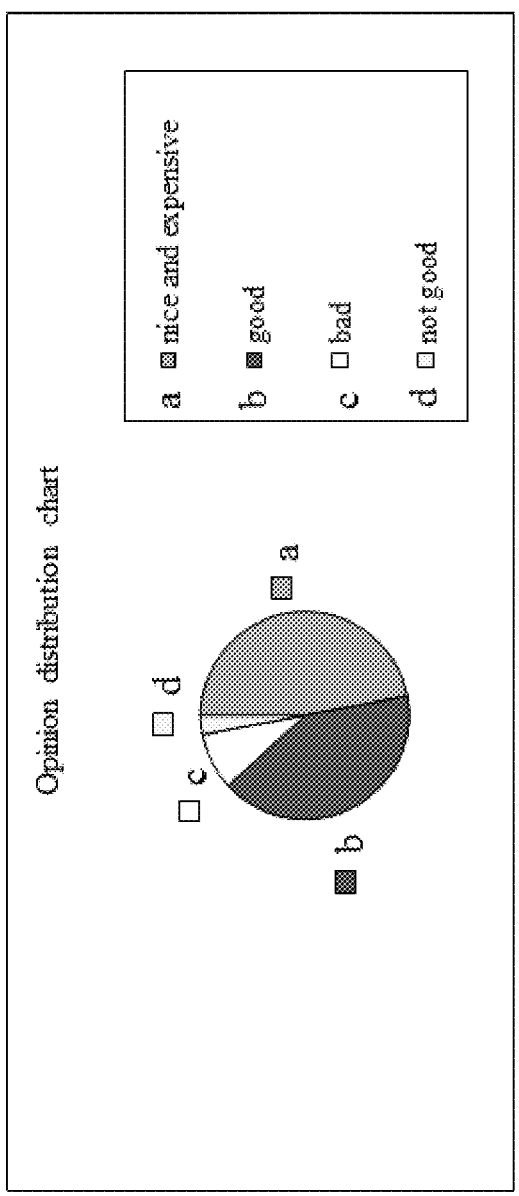
FIG. 4 illustrates an exemplary opinion distribution chart showing found opinion tuples according to an embodiment of the present disclosure.

For example, the statistical result of the opinion words in the found opinion tuple may be displayed by employing an exemplary chart shown in FIG. 4. Besides, the following Table 1 may be employed to display the statistical result:

TABLE 1

| Opinion words | quantity |
|---|---|
| nice and expensive | 16 |
| Good | 14 |
| Bad | 3 |
| not good | 1 |

When the opinion date are stored, not only the opinion tuple but also the opinioned sentence and source information corresponding to the opinion tuple are stored, wherein the source information may be used to screen the found opinion tuples to find those opinion tuples which are more conductive to support the user's decision making from the found opinion tuples. Hence, an embodiment of the present disclosure includes screening the found opinion tuples to find opinion tuples corresponding to one or more items of the source information selected by a user. The source information includes a text source name, a geographic location, time and the like, wherein one or more items in the text source information may be used to screen the found opinion tuples to obtain those opinion tuples corresponding to a specific text source, a specific geographic location and/or specific time.

For example, if only opinion data from the text source twitter are desired, opinion tuples of source information including the text source name "twitter" may be screened from the found opinion tuples.

According to a further embodiment of the present disclosure, it is also feasible to screen from the database opinion tuples corresponding to one or more items of the source information selected by the user, and then look up opinion tuples corresponding to the acquired opinion target from the screened opinion tuples.

Besides, according to a further embodiment of the present disclosure, an opinion and sentiment inclination tendency for a specific opinion target may be provided for the user according to the time in the source information. For example, the opinion holder's opinion and sentiment inclination tendency for the opinion target by looking up and creating statistics of the opinion word or sentiment value corresponding to one opinion target in several time points.

According to other embodiments of the present disclosure, the storage manner in the XML format facilitates extension, so that when the opinioned sentence is stored, gender, age and the like of the opinion holder may be determined and stored based on the opinioned sentence or by acquiring the text source of the opinioned sentence depending on demands. Then, when the opinion data are subsequently provided to the user, the statistical result may be displayed to the user based on factors such as the opinion holder's gender and age in the opinion tuples after the opinion tuples corresponding to the user-desired opinion target are found. For example, opinion and sentiment tendencies of opinion holders of different genders for a specific opinion target may be subjected to statistics and displayed to the user.

According to a further embodiment of the present disclosure, when the stored opinion data are used to support the decision making, not merely the found opinion tuples corresponding to the desired opinion target may be displayed, but the user may further drill down to get further information according to demands/requirements. In one example, one or more items of opinioned sentences and/or source information corresponding to the found opinion tuple may be further displayed according to instructions inputted by the user.

More accurate original information needed by the decision making may be provided to the user by displaying one or more items of opinioned sentences and/or source information corresponding to the found opinion tuples.

Still referring to FIG. 2, a decision-making means/module may be used to query the XML database storing the opinion data (such as opinioned sentences, opinion tuples and source information), and then acquire the opinion tuples related to the user-desired opinion target and present the acquired opinion tuples to the user in a predefined format. The decision-making means can further continue to drill down from the XML database to get more opinion data such as opinioned sentences and source information according to the user's demands. The decision making means/module may be a software component or a hardware component or a firmware component or a combination thereof.

The above has already illustrated the spirit and principles of the present disclosure in combination with several specific embodiments. In embodiments of the present disclosure, the opinioned sentences, the opinion tuples and the source information acquired from the text sources are stored in association so that the stored opinion data are associated to a certain degree, and the stored opinion data are easily extended and modified. Besides, since more opinion data capable of supporting the decision making are stored, the user can not only acquire the opinion words or sentiment value in the opinion tuples, but also can, depending on demands, continue to drill down to get original opinioned sentences corresponding to the opinion tuples and corresponding source information, thereby achieving convenient and all-round opinion data provision.

It should be noted that, although embodiments of the present disclosure are described in the environment of opinion data, the above method may also be applied to other types of data management. The term "opinion data" is only a general concept and should not be intended to limit the present disclosure.

Figure 5:
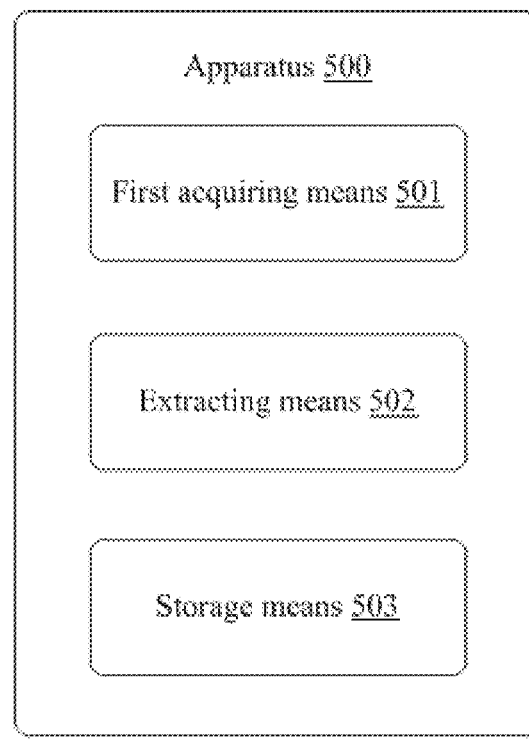
FIG. 5 illustrates an exemplary block diagram of an apparatus for managing opinion data according to an embodiment of the present disclosure.

FIG. 5 illustrates a block diagram of an apparatus 500 for managing opinion data according to an embodiment of the present invention. As shown in FIG. 5, the apparatus 500 includes a first acquiring means 501 for acquiring an opinioned sentence from one or more text sources; an extracting means 502 for extracting an opinion tuple based on the opinioned sentence, the opinion tuple at least containing opinion words and an opinion target, and a storage means 503 for storing in association the opinioned sentence, opinion tuple and source information corresponding to the opinioned sentence, wherein the source information is associated with the text source from which the opinioned sentence is acquired. It should be obvious to one skilled in the art that each of these first acquiring means, the extracting means and the storage means can be combined into a single module/apparatus 500, represented by a software component or a hardware component or a firmware component or a combination thereof.

Apparatus 500 of FIG. 5 may implement the method shown in FIG. 1, and although not further illustrated, the apparatus 500 may comprise more functional units or combine all functional units into a single module to implement a plurality of embodiments described with reference to the method 100 of FIG. 1 and the method 300 of FIG. 3.

Further, the apparatus 500 may store in association the opinioned sentence, opinion tuple and source information acquired from the text source so that the stored opinion data are associated to a certain degree, and the stored opinion data are easily extended and modified.

According to an embodiment of the present disclosure, there is provided an apparatus for managing opinion data, including at least one memory including computer program code, and at least one processor, wherein the at least one memory and the computer program code are configured, with the at least one processor, to cause the apparatus to at least implement a plurality of embodiments described with reference to the method 100 of FIG. 1 and the method 300 of FIG. 3.

Figure 6:
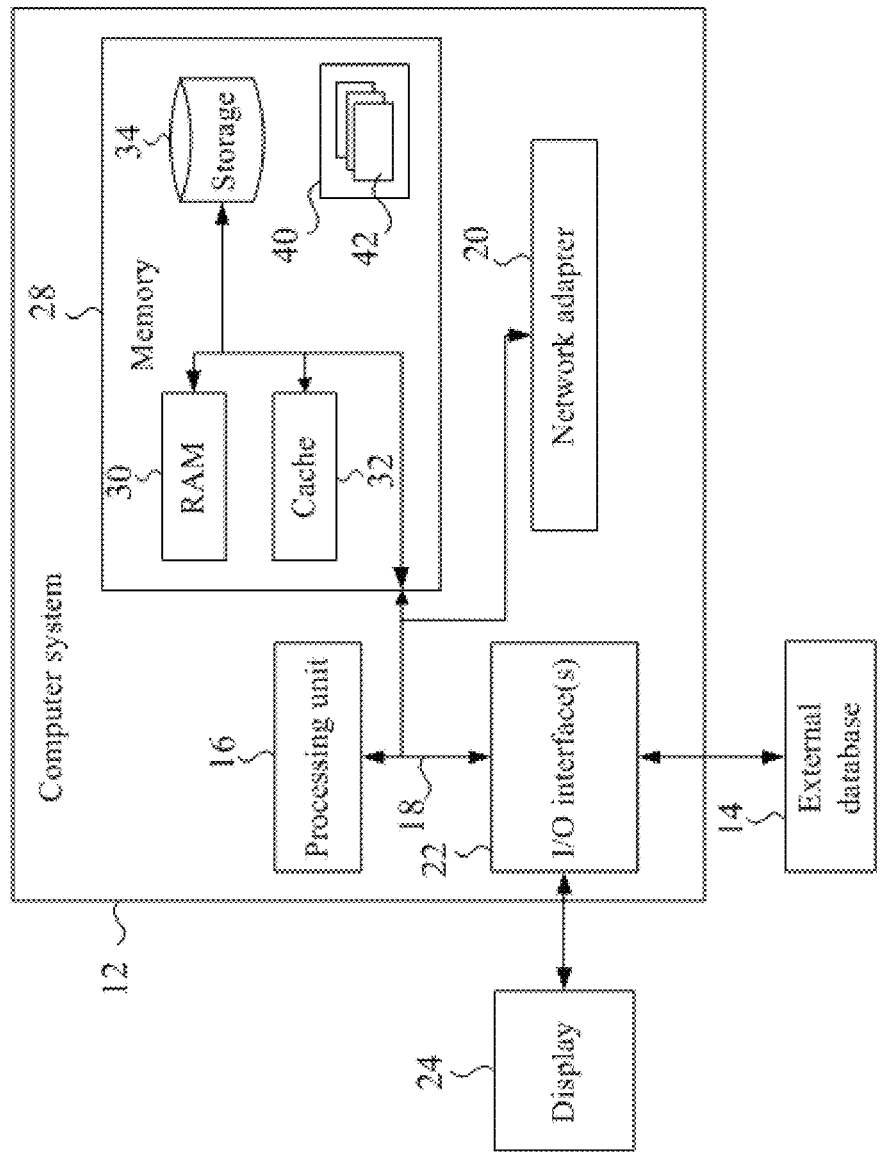
FIG. 6 illustrates a block diagram of an exemplary computer system for implementing an embodiment of the present disclosure.

FIG. 6 illustrates a block diagram of an exemplary computer system 12 applicable to implement the embodiments of the present disclosure. Computer system 12 is only an example and is not intended to suggest any limitation as to the scope of use or functionality of embodiments of the invention described herein.

As shown in FIG. 6, computer system 12 is shown in the form of a general-purpose computing device. The device may include and may not be limited to a mobile phone, a notebook computer, a desk-top computer, a portable computer, a personal digital assistant (PDA), and a tablet computer. The components of computer system 12 may include, but are not limited to, one or more processors or processing units 16, and a bus 18 that couples various system components including a system memory 28 to a processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as memory 30 and/or cache memory 32. Computer system 12 may further include other removable/non-removable, volatile/non-volatile computer system storage media. Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. Memory 28 may include at least one program product having a set of (e.g., at least one) program module(s) that are configured to carry out the functions of various embodiments of the invention.

Program/utility 40, having a set of (at least one) program module(s) 42, may be stored in memory 28 for example, and program module(s) 42 includes, but is not limited to, an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Depending on demands, computer system 12 may also communicate with one or more external devices such as a display 24 and an external database 14; one or more devices that enable a user to interact with computer system 12; and/or any devices (e.g., network card, modem, etc.) that enable computer system 12 to communicate with one or more other computing devices. Such communication can occur via input/output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

It should be noted that FIG. 6 only illustrates a block diagram of a computer system 12 that may implement the present invention. Those skilled in the art may implement various embodiments of the present invention by adopting other computer systems or apparatuses.

Especially, in addition to implementation by hardware, embodiments of the present invention may be implemented in the form of a computer program product. For example, the method 100 described with reference to FIG. 1 may be implemented by a computer program product. The computer program product may be stored in for example an RAM, buffer, memory and/or any proper storage medium shown in FIG. 6, or downloaded on a computer system from a proper position via a network. The computer program product may comprise a computer code portion, which includes program instructions executable by a proper processing apparatus (e.g., a processing unit shown in FIG. 6). The program instructions may at least include acquiring an opinioned sentence from one or more text sources; extracting an opinion tuple based on the opinioned sentence, the opinion tuple at least containing opinion words and an opinion target; storing in association the opinioned sentence, opinion tuple and source information corresponding to the opinioned sentence, wherein the source information is associated with the text source from which the opinioned sentence is acquired, and may advantageously perform the method as disclosed in FIG. 1 and FIG. 3.

It should be noted that, the embodiments of the present disclosure can be implemented in software, hardware or the combination thereof. The hardware part can be implemented by a special logic; the software part can be stored in a memory and executed by a proper instruction execution system such as a microprocessor or a design-specific hardware. Those ordinary skilled in the art may understand that the above methods and systems may be implemented with computer-executable instructions and/or in processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present disclosure may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

It should be noted that although a plurality of means or sub-means of the device have been mentioned in the above detailed depiction, such partitioning is merely non-compulsory. In actuality, according to the embodiments of the present invention, the features and functions of the above described two or more means may be embodied in one means. In turn, the features and functions of the above described one means may be further embodied in more modules.

Besides, although operations of the present methods are described in a particular order in the drawings, it does not require or imply that these operations must be performed according to this particular sequence, or a desired outcome can only be achieved by performing all shown operations. Rather, the execution order for the steps as depicted in the flowcharts may be varied. Additionally or alternatively, some steps may be omitted, a plurality of steps may be merged into one step, or a step may be divided into a plurality of steps for execution.

Although the present disclosure has been depicted with reference to a plurality of embodiments, it should be understood that the present disclosure is not limited to the disclosed embodiments. Rather, the present disclosure only intends to cover various modifications and equivalent arrangements included in the spirit and scope of the appended claims. The scope of the appended claims meets the broadest explanations and covers all such modifications and equivalent structures and functions.

What is claimed is:

1. A method for managing opinion data, comprising:
acquiring an opinioned sentence associated with a pre-defined subject from one or more text sources;
extracting an opinion tuple based on the opinioned sentence, the opinion tuple at least containing opinion words and an opinion target;
determining if the opinioned sentence is semantically equivalent with a previously-acquired opinioned sentence;
dropping the opinioned sentence in response to the opinioned sentence being identical with the previously-acquired opinioned sentence;
storing the opinioned sentence, the opinion tuple and source information corresponding to the opinioned sentence, and associating the source information with a text source from which the opinioned sentence is acquired; and
wherein storing the opinioned sentence, the opinion tuple and the source information corresponding to the opinioned sentence includes storing the opinioned sentence, the opinion tuple and the source information corresponding to the opinioned sentence in an extensible markup language (XML) format.

2. The method according to claim 1, wherein the opinion tuple further comprises an opinion holder and a sentiment value, and extracting the opinion tuple based on the opinioned sentence comprising:
performing syntactic parsing for the opinioned sentence to obtain the opinion target, opinion holder and opinion words contained in the opinioned sentence; and
determining the sentiment value based on the opinion words.

3. The method according to claim 2, wherein determining the sentiment value based on the opinion words comprises:
determining a sentiment score and a sentiment weight, wherein the sentiment weight affects a value for the sentiment score, corresponding to each opinion word; and
computing the sentiment value according to the sentiment score and sentiment weight of each opinion word.

4. The method according to claim 1, wherein the source information comprises one or more of a text source name, geographical location and time corresponding to the opinioned sentence.

5. The method according to claim 1, wherein storing the opinioned sentence, opinion tuple and source information corresponding to the opinioned sentence comprises:
classifying the opinioned sentence, opinion tuple and source information according to one or more items of the source information corresponding to the opinioned sentence; and
storing in association the opinioned sentence, opinion tuple and source information in each class.

6. The method according to claim 1, further comprises:
looking up an opinioned sentence including another opinion target from a database storing opinioned sentences, opinion tuples and source information corresponding to the opinioned sentences; and
adding another opinion target in the opinion tuple corresponding to the found opinioned sentence, wherein the another opinion target is a subset of opinion target previously contained in the opinion tuple corresponding to the found opinioned sentence.

7. The method according to claim 1, further comprises:
acquiring an opinion target provided as input by a user;
looking up the opinion tuples corresponding to the acquired opinion target from a database storing opinioned sentences, opinion tuples and source information corresponding to the opinioned sentences; and
displaying the found opinion tuples.

8. The method according to claim 7, wherein displaying the found opinion tuples comprises:
creating statistics of opinions words or sentiment values in the found opinion tuples; and
displaying a statistical result.

9. The method according to claim 7, further comprises:
screening the found opinion tuples to find opinion tuples corresponding to one or more items of the source information selected by the user; and displaying the screened opinion tuples.

10. The method according to claim 7, further comprises:
displaying one or more items of opinioned sentences and source information corresponding to the found opinion tuples according to instructions received as input by the user.

11. The method according to claim 1, wherein dropping the opinioned sentence in response to the opinioned sentence being identical with the previously-acquired opinioned sentence comprises dropping the opinioned sentence in response to the semantic meaning contained in the opinioned sentence and in the previously-acquired opinioned sentence being identical according to natural language rules.

12. An apparatus comprising at least one storage device and at least one hardware processor configured to manage opinion data, the processor comprising:
a module configured
for acquiring an opinioned sentence associated with a pre-defined subject from one or more text sources;
for extracting an opinion tuple based on the opinioned sentence, the opinion tuple at least containing opinion words and an opinion target;

for determining if the opinioned sentence is semantically equivalent with a previously-acquired opinioned sentence;

for dropping the opinioned sentence in response to the opinioned sentence being identical with the previously-acquired opinioned sentence; and for storing the opinioned sentence, the opinion tuple and source information corresponding to the opinioned sentence, and associating the source information with a text source from which the opinioned sentence is acquired; and wherein the opinioned sentence, the opinion tuple and the source information corresponding to the opinioned sentence are stored, at least in part by storing the opinioned sentence, the opinion tuple and the source information corresponding to the opinioned sentence in an extensible markup language (XML) format.

13. The apparatus according to claim 12, wherein the opinion tuple further comprises an opinion holder and a sentiment value, and also is configured for performing syntactic parsing for the opinioned sentence to obtain the opinion target, opinion holder and opinion words contained in the opinioned sentence; and for determining the sentiment value based on the opinion word.

14. The apparatus according to claim 13, further configured for determining a sentiment score and a sentiment weight, wherein the sentiment weight affects a value for the sentiment score, corresponding to each opinion word; and for computing the sentiment value according to the sentiment score and sentiment weight of each opinion word.

15. The apparatus according to claim 12, wherein the source information comprises one or more of a text source name, geographical location and time corresponding to the opinioned sentence.

16. The apparatus according to claim 15, further configured for classifying the opinioned sentence, opinion tuple and source information according to one or more items of the source information corresponding to the opinioned sentence; and storing the opinioned sentence, opinion tuple and source information in each class.

17. The apparatus according to claim 12, further comprises: looking up an opinioned sentence including other opinion target from a database storing opinioned sentences, opinion tuples and source information corresponding to the opinioned sentences; and adding the other opinion target in the opinion tuple corresponding to the found opinioned sentence, wherein the another opinion target is a subset of opinion target previously contained in the opinion tuple corresponding to the found opinioned sentence.

* * * * *